(12) United States Patent
Nishimiya

(10) Patent No.: US 10,926,338 B2
(45) Date of Patent: Feb. 23, 2021

(54) CHUCK MECHANISM

(71) Applicant: KITAGAWA IRONWORKS CO., LTD., Fuchu (JP)

(72) Inventor: Tamio Nishimiya, Fuchu (JP)

(73) Assignee: KITAGAWA IRONWORKS CO., LTD., Fuchu (JP)

( * ) Notice: Subject to any disclaimer, the term of this patent is extended or adjusted under 35 U.S.C. 154(b) by 0 days.

(21) Appl. No.: 16/634,578

(22) PCT Filed: May 22, 2018

(86) PCT No.: PCT/JP2018/019724
§ 371 (c)(1),
(2) Date: Jan. 28, 2020

(87) PCT Pub. No.: WO2019/021603
PCT Pub. Date: Jan. 31, 2019

(65) Prior Publication Data
US 2020/0230711 A1    Jul. 23, 2020

(30) Foreign Application Priority Data

Jul. 28, 2017  (JP) .............................. JP2017-146255

(51) Int. Cl.
*B23B 31/177*    (2006.01)

(52) U.S. Cl.
CPC .. *B23B 31/16233* (2013.01); *B23B 2260/146* (2013.01); *Y10T 279/1973* (2015.01)

(58) Field of Classification Search
CPC .................. B23B 31/16233; Y10T 279/1973
See application file for complete search history.

(56) References Cited

U.S. PATENT DOCUMENTS 4,410,192 A * 10/1983 Nobukawa ........ B23B 31/16266
279/121
4,982,970 A   1/1991 Otani et al.
(Continued)

FOREIGN PATENT DOCUMENTS

DE    4137460 A2    5/1993
JP    S55-125712 U    9/1980
(Continued)

OTHER PUBLICATIONS

JP Office Action dated Mar. 12, 2018 as received in Application No. 2017-146255.
(Continued)

*Primary Examiner* — Eric A. Gates
(74) *Attorney, Agent, or Firm* — Maschoff Brennan

(57) ABSTRACT

The chuck mechanism includes: a chuck body 10; an axially movable plunger 40 disposed inside the chuck body; and a master jaw 20 radially movable by wedge action caused by fitting the plunger in the master jaw 20. A guide groove 11 that radially guides the master jaw and has a T-shaped cross section is formed in the chuck body. The master jaw has a narrow portion 23 and a wide portion 24 that form a T-shaped cross section. A wedge 21 fitted in a wedge groove 41 of the plunger is formed radially inside the wide portion. The end face 21a of the wedge in the width direction is positioned outward in the width direction with respect to the end face 23a of the narrow portion in the width direction.

5 Claims, 8 Drawing Sheets

(56) References Cited

U.S. PATENT DOCUMENTS

| | | | | |
|---|---|---|---|---|
| 5,842,703 | A | * 12/1998 | Antoni | ............. B23B 31/16233 |
| | | | | 279/123 |
| 5,890,720 | A | 4/1999 | Antoni | |
| 6,491,305 | B2 | * 12/2002 | Sida | ................. B23B 31/16279 |
| | | | | 279/124 |
| 7,311,312 | B2 | * 12/2007 | Nishimiya | ........ B23B 31/16266 |
| | | | | 279/121 |

FOREIGN PATENT DOCUMENTS

| | | | |
|---|---|---|---|
| JP | S55-125712 U1 | 9/1980 | |
| JP | 57114304 A * | 7/1982 | ....... B23B 31/16266 |
| JP | S61-8209 A | 1/1986 | |
| JP | S61-288904 A | 12/1986 | |
| JP | S64-34108 U | 3/1989 | |
| JP | H02-71911 A | 3/1990 | |
| JP | H10-58213 A | 3/1998 | |
| JP | 2015-58529 A | 3/2015 | |
| WO | 2009/025457 A2 | 2/2009 | |
| WO | WO-2019107142 A1 * | 6/2019 | ....... B23B 31/16237 |

OTHER PUBLICATIONS

JP Decision to Grant a Patent dated Apr. 26, 2018 as received in Application No. 2017-146255.

\* cited by examiner (a)

(b)

(a)

(b)

PRIOR ART

PRIOR ART

US 10,926,338 B2

CHUCK MECHANISM

TECHNICAL FIELD

The present invention relates to a chuck mechanism that holds a work.

BACKGROUND ART

A chuck mechanism that holds a work includes master jaws disposed to be radially movable on the front face of a chuck body and top jaws attached to the respective front faces of the master jaws and hold a work.

As a means for controlling the master jaws to be radially movable, Patent Document 1 describes a mechanism in which a master jaw is radially moved by wedge action caused by fitting a wedge provided in the master jaw in a wedge groove provided in a plunger and axially moving the plunger. In addition, a reinforcement rib orthogonal to the wedge is formed in the master jaw to reinforce the wedge.

CITATION LIST

Patent Document

Patent Document 1: Japanese Patent No. 2560114.

SUMMARY OF THE INVENTION

Technical Problem

In the chuck mechanism described in Patent Document 1, a guide groove (T-shaped groove) is formed in a chuck body, and the master jaw is guided along this guide groove and is moved radially. Then, the plunger moves toward an axially rear side, whereby the master jaw moves toward radially inside by wedge action. Accordingly, the top jaw fixed to the master jaw holds a work. In this case, as will be described later in detail, the following problem arises.

That is, when the top jaw holds a work, reaction force from the work is applied to the top jaw, and a load from the plunger is applied to the wedge on the master jaw. Therefore, the reaction force from the work and the load from the plunger form a couple of forces, and a moment to rotate the master jaw is generated. On the other hand, the master jaw is prevented from being rotated by the guide groove of the chuck body. Thus, reaction force against the moment is applied from the chuck body to the master jaw. However, an area that receives the reaction force in the master jaw is thin and has low rigidity. Thus, the master jaw is elastically deformed by the application of the reaction force. As a result, at the time of holding a work, a problem of increased degree of axial lifting of the top jaw fixed to the master jaw (hereinafter merely referred to as "lifting") arises.

Specifically, the above-described problem becomes apparent in the case where a large through hole is formed in the chuck body without changing the outer diameter, and a work having a large diameter is inserted in the through hole to process the work. That is, a large through hole formed without changing the outer diameter of the chuck body causes reduction in thickness of the chuck body, rigidity of the chuck body, and length of the master jaw, i.e., the length of the guide groove of the chuck body. Accordingly, the reaction force against the moment applied to the master jaw is increased. Therefore, lifting of the top jaw caused by the reduction in rigidity of the chuck body and the increase in reaction force applied to the master jaw becomes more apparent.

The present invention has been made in view of the above problem, and it is an object of the present invention to provide a chuck mechanism capable of reducing lifting of a top jaw at the time of holding a work.

Solution to the Problem

The chuck mechanism according to the present invention includes: a chuck body; an axially movable plunger disposed inside the chuck body; and a master jaw that is disposed in an axially front face of the chuck body and is radially movable by wedge action caused by fitting the plunger in the master jaw, wherein a guide groove that radially guides the master jaw and has a T-shaped cross section is formed in the axially front face of the chuck body, the master jaw has a narrow portion and a wide portion that form a T-shaped cross section, a wedge projecting toward an axially rear side is formed radially inside the wide portion, and the wedge is fitted in a wedge groove formed in the plunger, and an end face of the wedge in the width direction is positioned outward in a width direction with respect to an end face of the narrow portion in the width direction.

Advantages of the Invention

The present invention can provide a chuck mechanism capable of reducing lifting of a top jaw at the time of holding a work.

DESCRIPTION OF EMBODIMENTS

Before describing the present invention, a factor of lifting caused by moving a master jaw toward radially inside by wedge action to hold a work in a conventional chuck mechanism will be described with reference to FIGS. 6 to 9.

Figure 6:
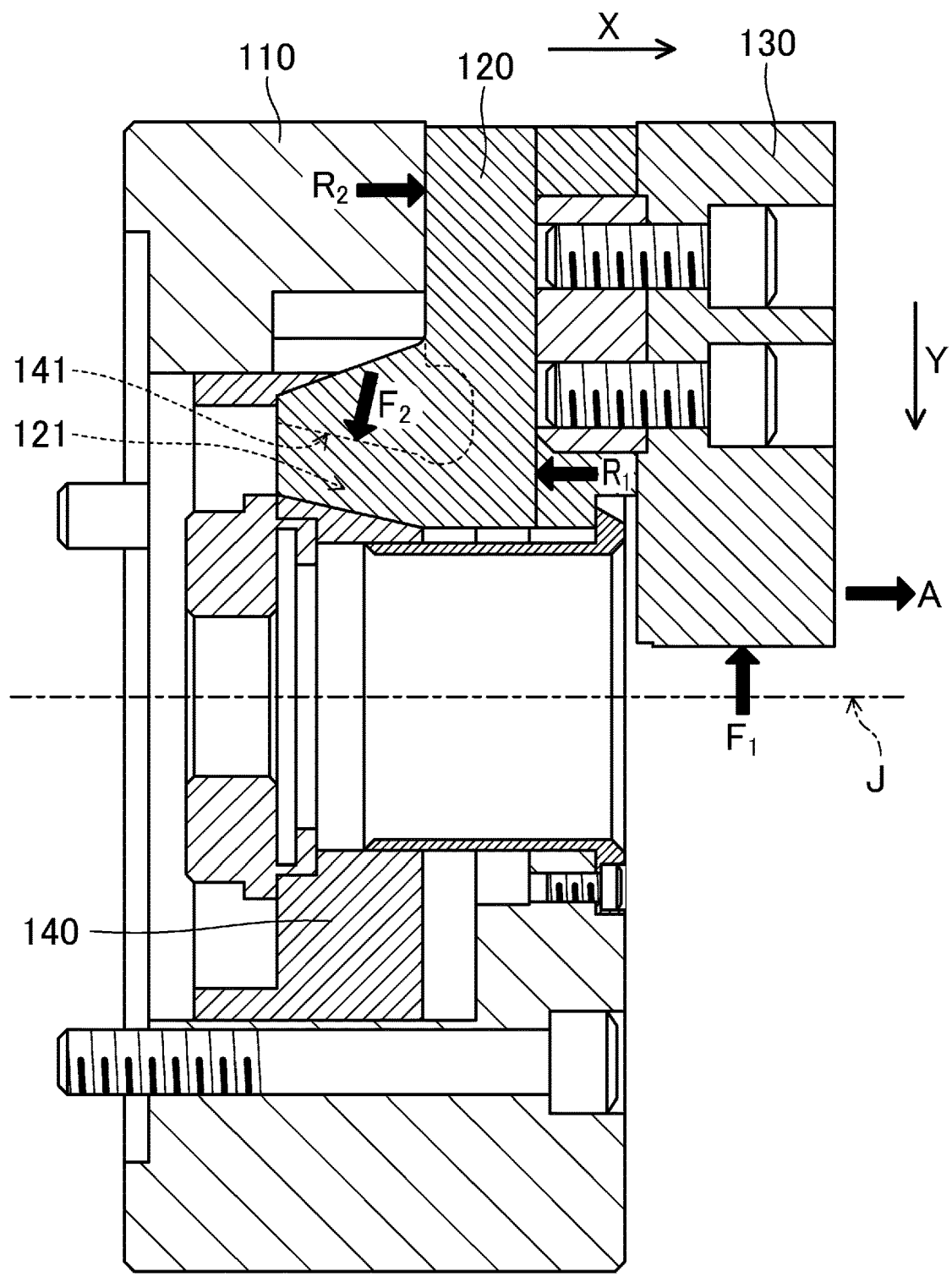
FIG. 6 is a cross-sectional view illustrating a configuration of a conventional chuck mechanism.
Figure 7:
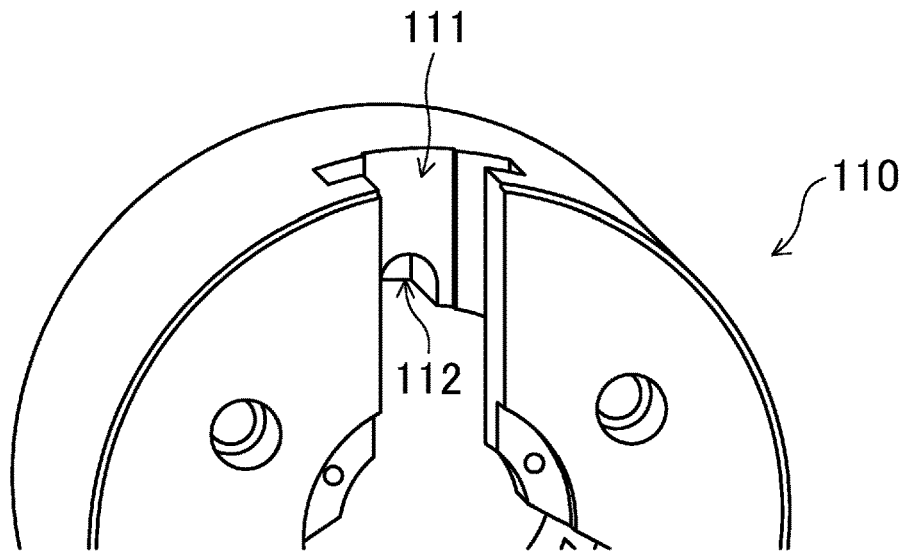
FIG. 7 is a perspective view partially illustrating a configuration of a conventional chuck body.
Figure 8:
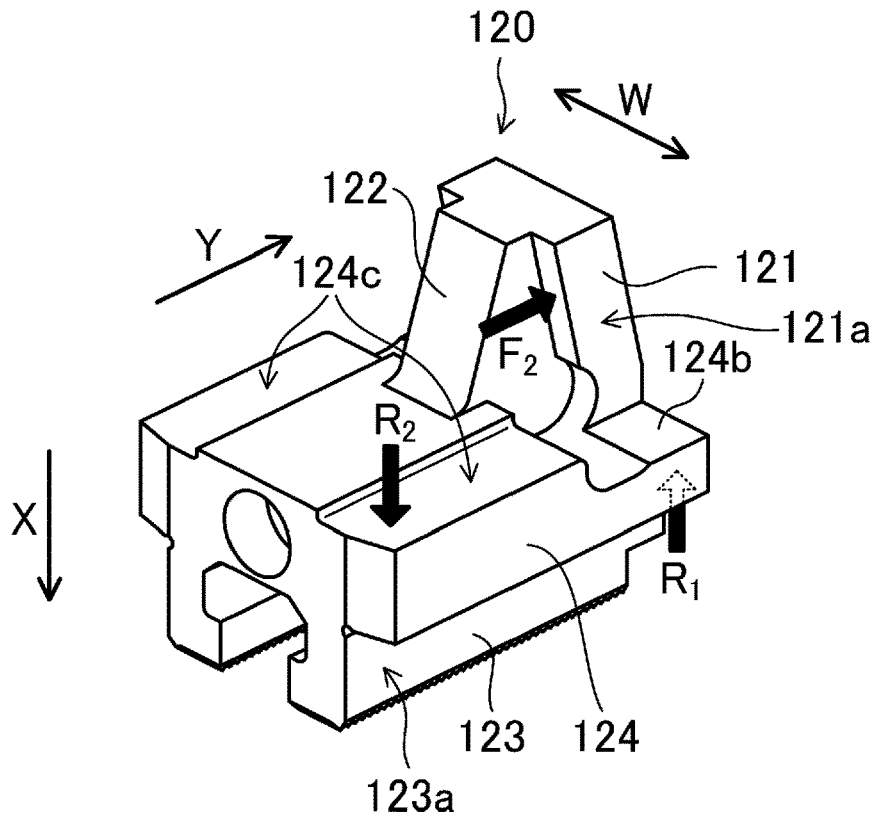
FIG. 8 is a perspective view illustrating a configuration of a conventional master jaw.
Figure 9:
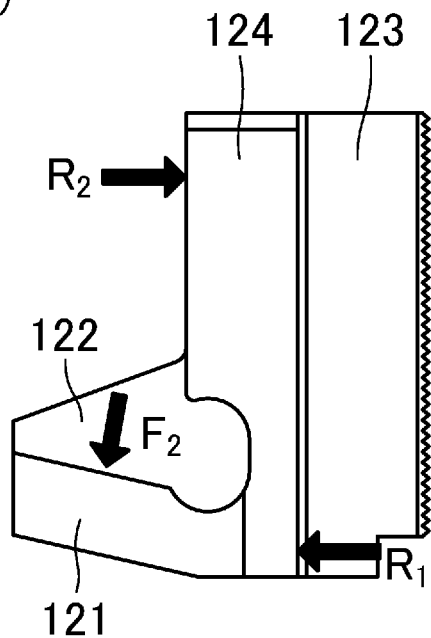
FIGS. 9A to 9C are a front view, a plan view, and a side view of the conventional master jaw as viewed from the width direction, respectively.
Figure 9:
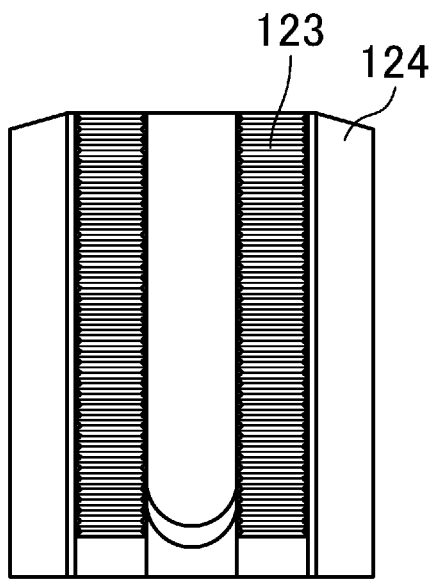
Figure 9:
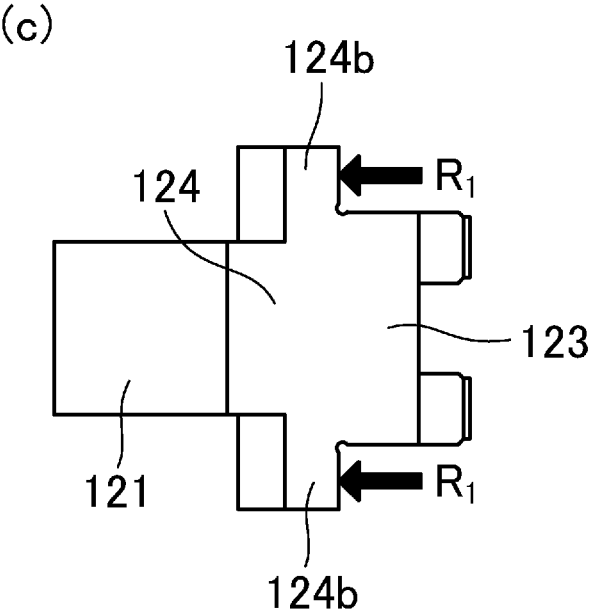

FIG. 6 is a cross-sectional view illustrating a configuration of a conventional chuck mechanism. FIG. 7 is a perspective view partially illustrating a configuration of a chuck body. FIG. 8 is a perspective view illustrating a configuration of a master jaw. In the description of the present specification, the direction X parallel with the rotational axis J of the chuck body is represented by "axially," and a side on which a work is held is represented by "front," and the side opposite to the front side is represented by "rear." Moreover, the radial direction Y centered around the rotational axis J of the chuck body is represented by "radially," and the central side is represented by "inside" and the side opposite to the central side is represented by "outside."

As illustrated in FIG. 6, a radially movable master jaw 120 is disposed on an axially front face of the chuck body 110, and a top jaw 130 is attached to the front face of the master jaw 120. Further, an axially movable plunger 140 is disposed inside the chuck body 110.

As illustrated in FIG. 7, a guide groove 111 that radially guides the master jaw 120 and has a T-shaped cross section is formed in the axially front face of the chuck body 110.

As illustrated in FIG. 8, the master jaw 120 includes a narrow portion 123 having a shorter length in the width direction W and a wide portion 124 having a longer length in the width direction W and has a T-shaped cross section formed of the narrow portion 123 and the wide portion 124. The master jaw 120 radially moves with the wide portion 124 being guided along a wider groove of the guide groove 111.

A wedge 121 projecting toward the axially rear side is formed radially inside the wide portion 124 of the master jaw 120. In addition, a reinforcement rib 122 orthogonal to the wedge 121 is formed to reinforce the wedge 121. Further, a rib avoidance groove 112 for avoiding interference with the reinforcement rib 122 is formed in the chuck body 110 as illustrated in FIG. 7.

The surface 124c of the wide portion 124 in contact with a guide portion 111 needs to be polished so that the wide portion 124 in the master jaw 120 is guided and moves along the wider groove of the guide groove 111 in the chuck body 110. However, the radially outer end face of the reinforcement rib 122 is overhung radially outside an area in contact with the guide groove 111 of the chuck body 110 in the wide portion 124. Thus, the surface 124c of the wide portion 124 at both ends cannot be polished along the width direction W. Thus, the surface 124c of the wide portion 124 needs to be polished along the radial direction Y. However, in this case, the width of the wedge 121 needs to be narrowed to avoid interference of the wedge 121 with polishing in the radial direction Y. To achieve this, the end face 121a of the wedge 121 in the width direction is positioned inward in the width direction with respect to the end face 123a of the narrow portion 123 in the width direction.

Turning to FIG. 6, a factor of lifting generated at the time of holding a work is now described.

As illustrated in FIG. 6, a wedge groove 141 in which the wedge 121 formed in the master jaw 120 is fitted is formed in the plunger 140. The plunger 140 moves toward the axially rear side, whereby the master jaw 120 moves radially inside by wedge action. Accordingly, the top jaw 130 fixed to the master jaw 120 holds the outer diameter of a work (not shown).

When the top jaw 130 holds the work, reaction force F1 is applied from the work to the top jaw 130 as illustrated in FIG. 6. With the application of the reaction force, a load F2 is applied from the plunger 140 to the wedge 121 of the master jaw 120, fitted in the wedge groove 141 of the plunger 140. Therefore, the reaction force F1 from the work and the load F2 from the plunger 140 form a couple of forces, and a moment to rotate the master jaw 120 counterclockwise is generated.

On the other hand, the master jaw 120 is prevented from being rotated by the guide groove 111 of the chuck body 110. Thus, reaction forces R1 and R2 against the moment are applied to the master jaw 120 from the chuck body 110 as illustrated in FIG. 6.

That is, as illustrated in FIG. 8, in the master jaw 120, the load F2 from the plunger 140 is applied to the wedge 121, and the reaction forces R1 and R2 against the moment are also applied to an area, of the wide portion 124, in contact with the guide groove 111 of the chuck body 110.

FIGS. 9A to 9C illustrate a front view, a plan view, and a side view of the load F2 and reaction forces R1 and R2 applied to the master jaw 120 as viewed from the width direction W of the master jaw 120.

In particular, as illustrated in FIG. 9C, the area 124b of the wide portion 124, which receives the reaction force R1 is thin and has low rigidity because the wedge 121 is not formed therein. Thus, the reaction force R1 applied to this area 124b elastically deforms the area 124b. This deformation is a factor of increasing the degree of lifting of the top jaw 130 at the time of holding the work.

Further, a rib avoidance groove 112 for avoiding interference with the reinforcement rib 122 is formed in the chuck body 110 as illustrated in FIG. 7. Therefore, the chuck body 110 is thin, and hence has reduced rigidity, in an area where the rib avoidance groove 112 is formed. As a result, a load (a force that has the same magnitude as the reaction force R1 and is in the opposite direction to the reaction force R1) applied from the master jaw 120 to the guide groove 111 elastically deforms the chuck body 110. This deformation is a factor of increasing the degree of the lifting of the top jaw 130.

The problem of increased degree of lifting caused by this factor is particularly apparent in the case of increasing the size of a through hole without changing the outer diameter of the chuck body 110 and inserting a work having a large diameter into the through hole to process the work. That is, when the size of the through hole is increased without changing the outer diameter of the chuck body 110, the chuck body 110 becomes thin, which leads to a reduction in rigidity of the chuck body 110, and the length of the master jaw 120, i.e., the length of the guide groove 111 of the chuck body 10, is shortened. Accordingly, the reaction forces R1 and R2 against the moment applied to the master jaw 120 are increased. Therefore, by the reduction in rigidity of the chuck body 110 and the increase in reaction forces R1 and R2 applied to the master jaw 120, lifting of the top jaw 130 caused by these factors becomes more apparent.

The invention of the present application is to provide a chuck mechanism capable of reducing lifting of the top jaw at the time of holding a work on the basis of this finding.

An embodiment of the present invention is described in detail below on the basis of the drawings. It should be noted that the present invention is not limited to the following embodiments. The present invention may be modified in various ways without departing from the scope and spirit of the present invention.

Figure 1:
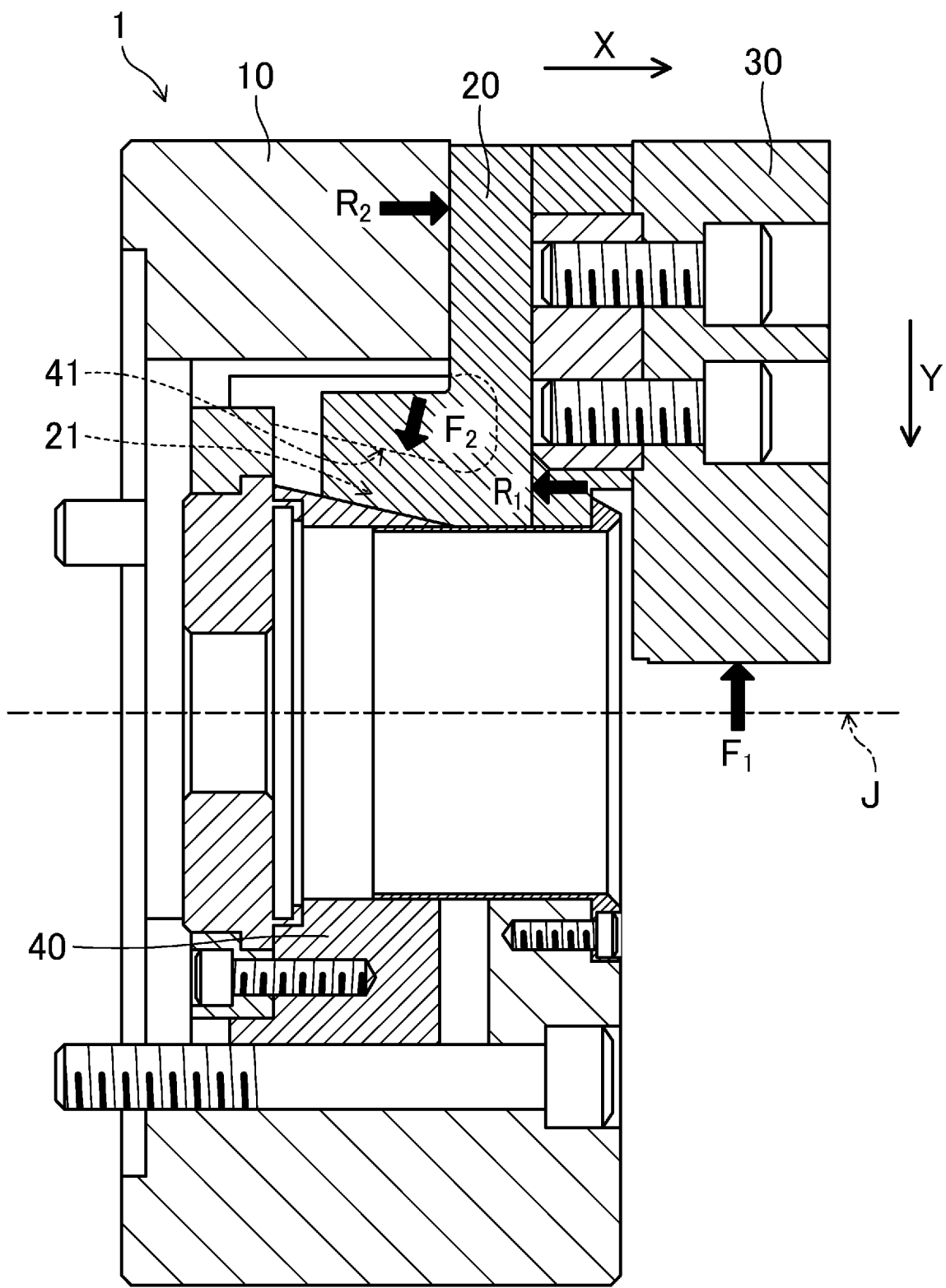
FIG. 1 is a cross-sectional view schematically illustrating a configuration of a chuck mechanism according to an embodiment of the present invention.

FIG. 1 is a cross-sectional view schematically illustrating a configuration of a chuck mechanism 1 according to the first embodiment of the present invention.

As illustrated in FIG. 1, in the chuck mechanism 1 according to the present embodiment, a radially movable master jaw 20 is disposed on an axially front face of a chuck body 10, and a top jaw 30 is attached to a front face of the master jaw 20. Further, an axially movable plunger 40 is disposed inside the chuck body 10.

Figure 2:
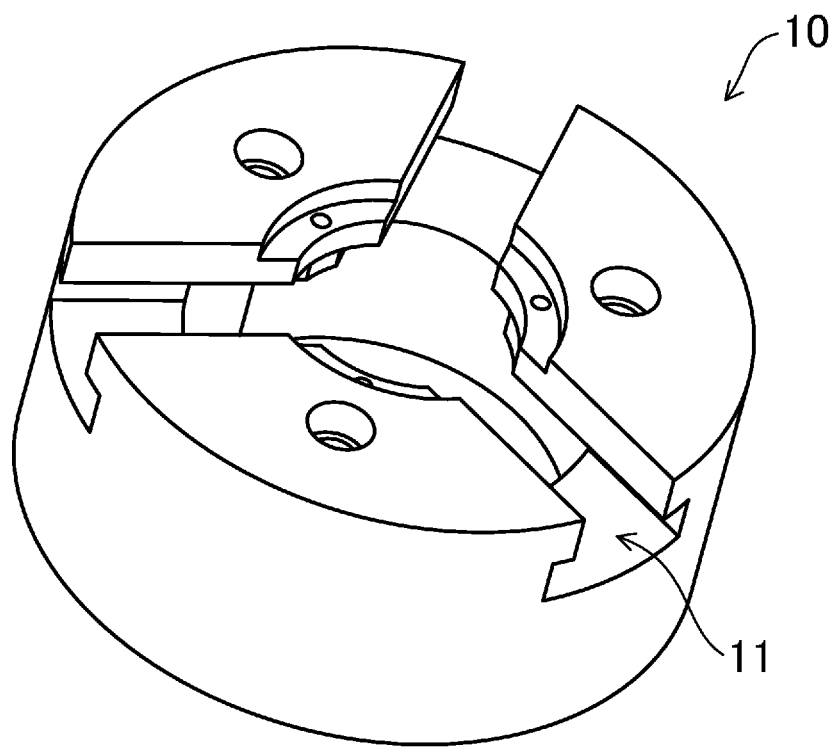
FIG. 2A is a perspective view illustrating a configuration of a chuck body according to the embodiment of the present invention.
FIG. 2B is a perspective view illustrating a configuration of a plunger according to the embodiment of the present invention.
Figure 2:
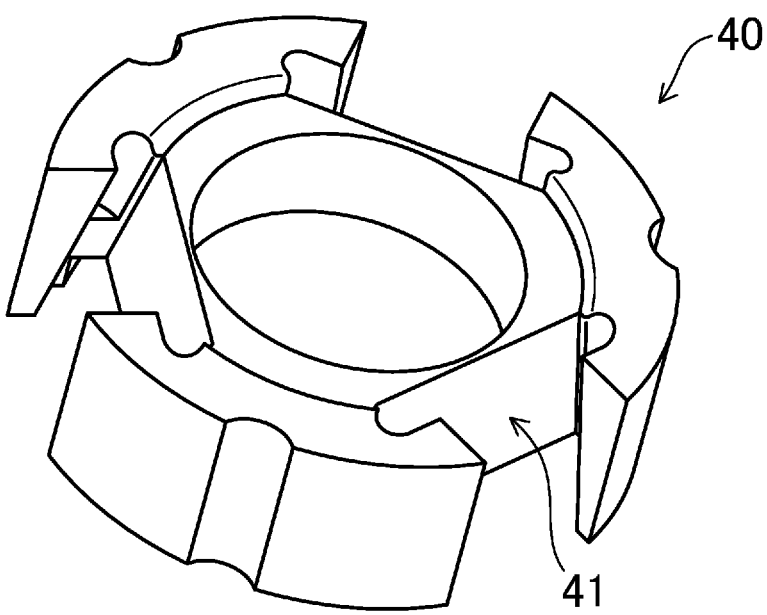

FIG. 2A is a perspective view illustrating a configuration of the chuck body 10 according to the present embodiment, and FIG. 2B is a perspective view illustrating a configuration of the plunger 40 according to the present embodiment.

As illustrated in FIG. 2A, a guide groove 11 that radially guides the master jaw 20 and has a T-shaped cross section is formed in the axially front face of the chuck body 10.

As illustrated in FIG. 2B, a wedge groove 41 in which the wedge formed in the master jaw 20 is fitted is formed in the plunger 40.

Figure 3:
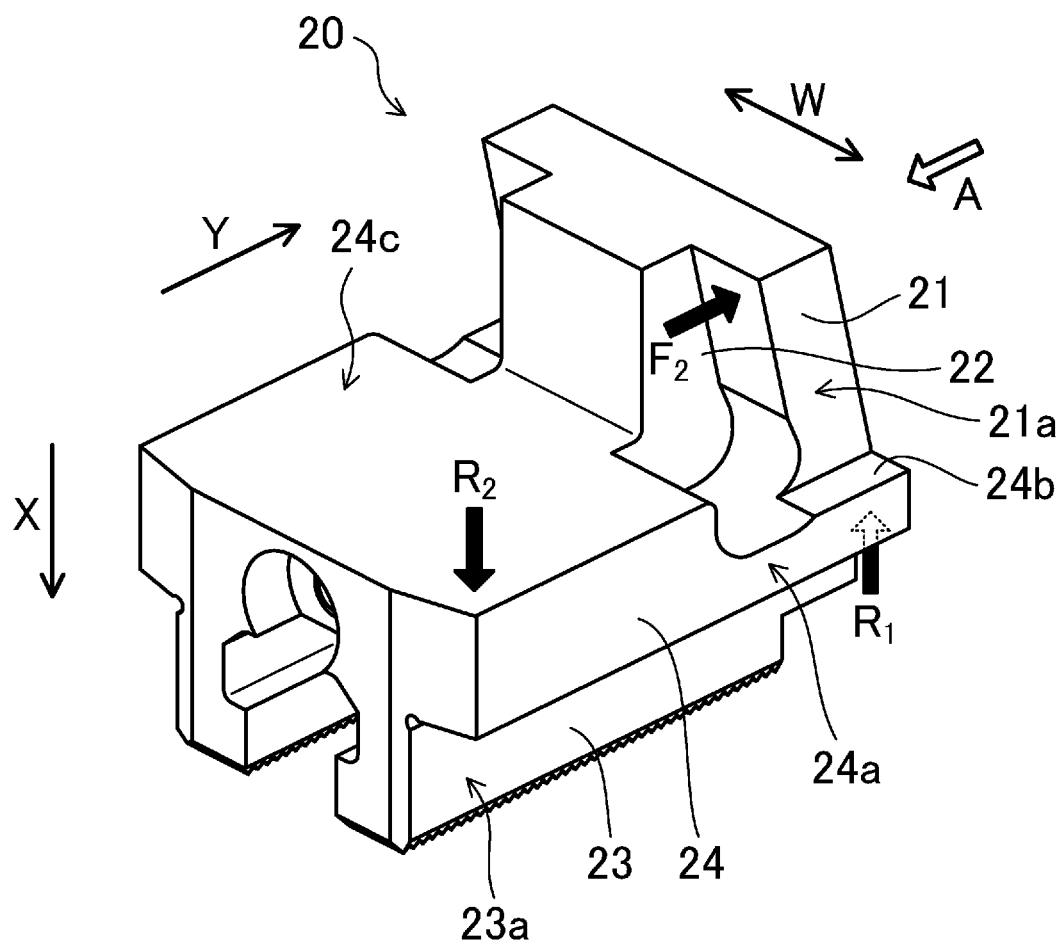
FIG. 3 is a perspective view schematically illustrating a configuration of a master jaw according to the embodiment of the present invention.

FIG. 3 is a perspective view schematically illustrating a configuration of the master jaw according to the present embodiment.

As illustrated in FIG. 3, the master jaw 20 includes a narrow portion 23 having a smaller length in the width direction W and a wide portion 24 having a larger length in the width direction W, and a T-shaped cross section is formed of the narrow portion 23 and the wide portion 24. The master jaw 20 radially moves with the wide portion 24 being guided along a wider groove of the guide groove 11.

A wedge 21 projecting toward the axially rear side is formed radially inside the wide portion 24 of the master jaw 20. In addition, the wedge 21 in the present embodiment has a longer length in the width direction W than the conventional wedge 121 illustrated in FIG. 8.

When the top jaw 30 holds the outer diameter of a work (not shown) as illustrated in FIG. 1, reaction force F1 is applied from the work to the top jaw 30 in the same manner as illustrated in FIG. 6. With the application of the reaction force, a load F2 is applied from the plunger 40 to the wedge 21 of the master jaw 20, fitted in the wedge groove 41 of the plunger 40. Therefore, the reaction force F1 from the work and the load F2 from the plunger 40 form a couple of forces, and a moment to rotate the master jaw 20 counterclockwise is generated. On the other hand, the master jaw 20 is prevented from being rotated by the guide groove 11 of the chuck body 10. Thus, reaction forces R1 and R2 against the moment are applied to the master jaw 20 from the chuck body 10.

That is, as illustrated in FIG. 3, in the master jaw 20, the load F2 from the plunger 40 is applied to the wedge 21, and the reaction forces R1 and R2 against the moment are also applied to an area, of the wide portion 24, in contact with the guide groove 11 of the chuck body 10.

Figure 4:
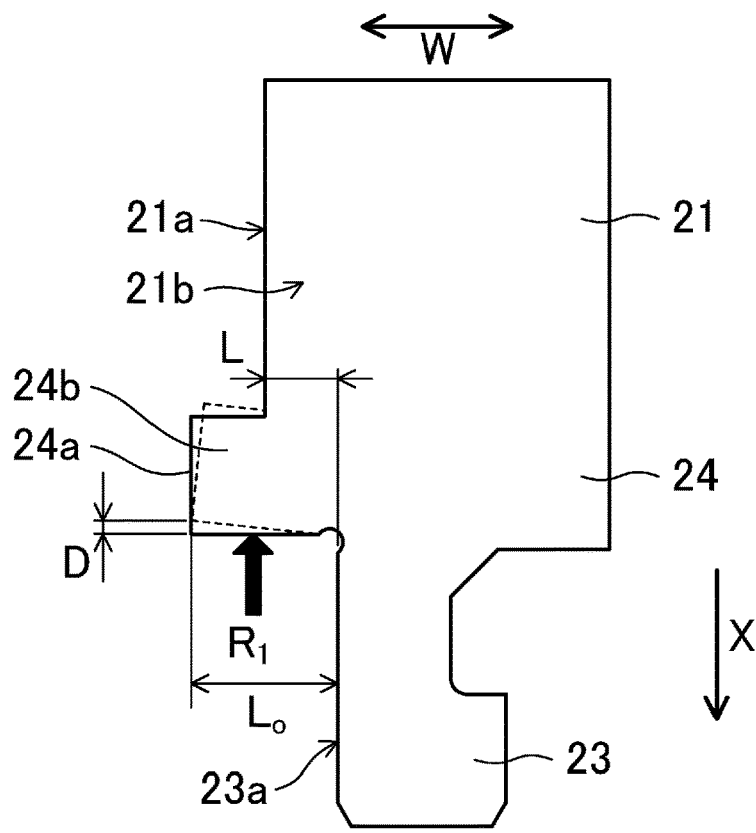
FIG. 4A is a side view of the master jaw as viewed from an arrow A illustrated in FIG. 3.
FIG. 4B is a graph showing a relationship between the distance L between an end face of a narrow portion in the width direction and an end face of a wedge in the width direction and displacement D of an area in which the wedge is not formed in a wide portion.
Figure 4:
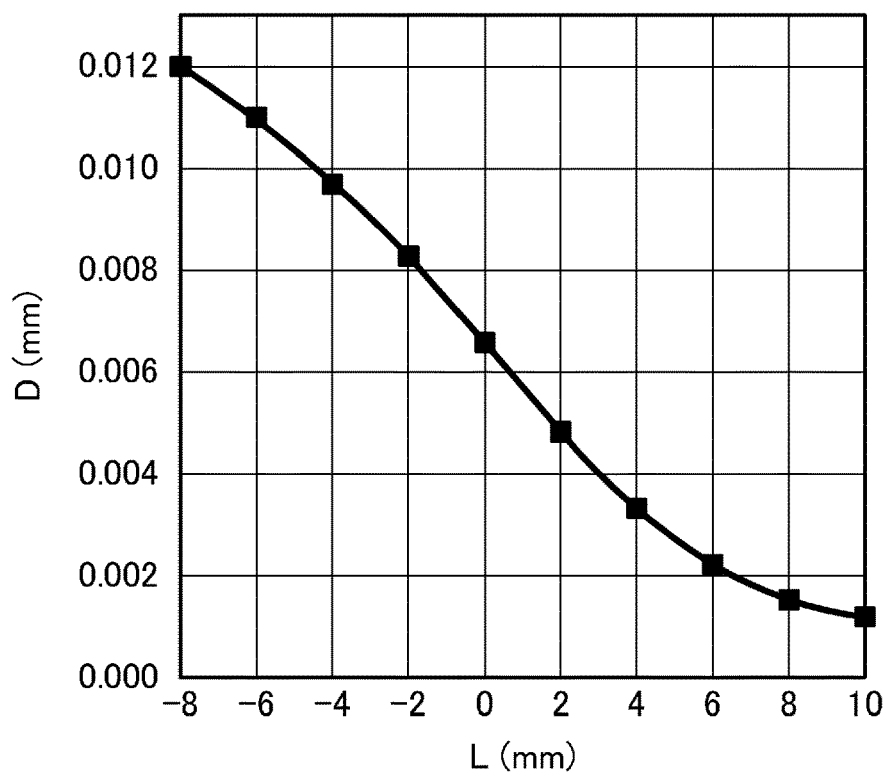

Advantages of the chuck mechanism 1 according to the present embodiment are now described with reference to FIGS. 4A and 4B. FIG. 4A is a side view of the master jaw 20 as viewed from an arrow A illustrated in FIG. 3.

As illustrated in FIG. 4A, in the present embodiment, the wedge 21 is formed such that the end face 21a of the wedge 21 in the width direction is positioned outward in the width direction with respect to the end face 23a of the narrow portion 23 in the width direction. Therefore, even when the reaction force R1 is applied to the area 24b where the wedge 21 is not formed in the wide portion 24, the displacement of the area 24b can be reduced by the area 21b projecting outward in the width direction with respect to the end face 23a of the narrow portion 23 in the width direction. The area 21b therefore serves as a support. Accordingly, lifting of the top jaw 30 at the time of holding a work can be reduced.

FIG. 4B is a graph showing a relationship between displacement of the area 24b and the distance L from the end face 23a, as a reference, of the narrow portion 23 in the width direction to the end face 21a of the wedge 21 in the width direction. The displacement D in a case in which the distance L is minus represents, as illustrated in FIG. 8, the case of the conventional wedge 121 where the end face 121a of the wedge 121 in the width direction is positioned inward in the width direction with respect to the end face 123a of the narrow portion 123 in the width direction.

As illustrated in FIG. 4B, when the end face 21a of the wedge 21 in the width direction is positioned outward in the width direction with respect to the end face 23a of the narrow portion 23 in the width direction (L>0), the displacement D of the area 24b is greatly reduced compared with the conventional wedge 121 (L<0). For example, in the case of using the conventional wedge 121 satisfying L=−3 mm, the displacement D is about 0.009 mm, whereas in the case of using the wedge 21 according to the present embodiment satisfying L=3 mm, the displacement D is about 0.004 mm That is, the displacement D is reduced to half or less.

Since, in the present embodiment, the end face 21a of the wedge 21 in the width direction is formed to be positioned outward in the width direction with respect to the end face 23a of the narrow portion 23 in the width direction (L>0), lifting of the top jaw 30 at the time of holding a work can be reduced. Accordingly, the chuck mechanism 1 in which lifting of the top jaw 30 at the time of holding a work is reduced even if the through hole is increased in size without changing the outer diameter of the chuck body 10 can be achieved.

Figure 5:
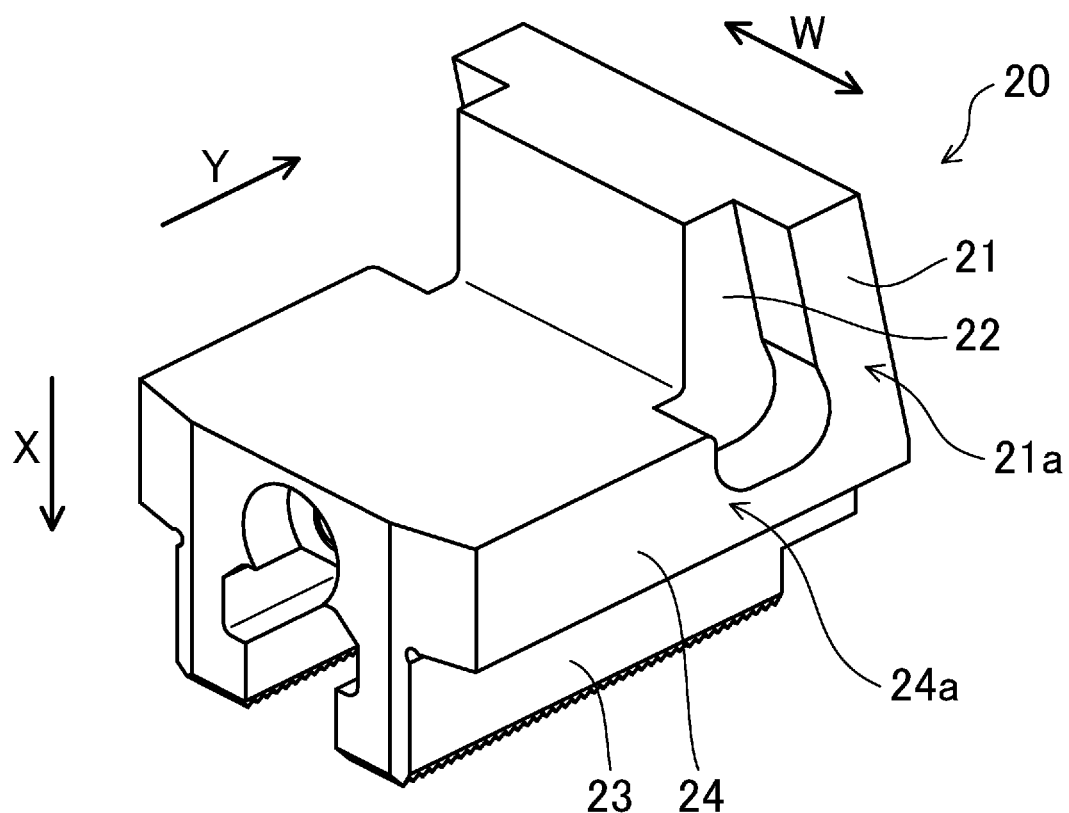
FIG. 5 is a perspective view schematically illustrating another configuration of the master jaw according to the embodiment of the present invention.

The advantages of the present invention are exhibited by the present embodiment in which the end face 21a of the wedge 21 in the width direction is positioned outward in the width direction with respect to the end face 23a of the narrow portion 23 in the width direction (L>0). The advantages of the present invention are more significantly exhibited by forming the end face 21a of the wedge 21 in the width direction to satisfy $L \geq \frac{1}{3} \times L_0$, more preferably $L \geq \frac{2}{3} \times L_0$, where the distance between the end face 23a of the narrow portion 23 in the width direction and the end face 24a of the wide portion 24 in the width direction is represented by $L_0$. Further, as illustrated in FIG. 5, the end face 21a of the wedge 21 in the width direction may be formed to be flush with the end face 24a of the wide portion 24 in the width direction ($L=L_0$).

Further, in the present embodiment, with the increase in width of the wedge 21, the width of the reinforcement rib 22 formed on radially outer side face of the wedge 21 so as to be orthogonal to the wedge 21 can be increased. Since the reinforcement rib 22 has a sufficient thickness (the thickness in the width direction), the wedge 21 is allowed to have sufficient strength without forming, as in the conventional reinforcement rib 122, the reinforcement rib 122 so as to be overhung radially outside an area in contact with the guide groove 11 of the chuck body 10 in the wide portion 24. Further, it is not necessary to form, in the chuck body 10, a rib avoidance groove 112 for avoiding interference with the reinforcement rib 22 as illustrated in FIG. 7. As a result, the rigidity of the chuck body 10 is increased, so that the listing caused by the elastic deformation of the chuck body 10 can be reduced. Further, the cost of producing the chuck mechanism 1 can be reduced because the processing of forming the rib avoidance groove 112 is not necessary.

Moreover, in the present embodiment, the radially outer end face of the reinforcement rib 22 is positioned radially inside an area in contact with the guide groove 11 of the chuck body 10 in the wide portion 24. Accordingly, the surface 24c of the wide portion 24 can be polished along the width direction W. Therefore, even when the wedge 21 is wide, the wedge 21 does not interfere with polishing of the surface 24c of the wide portion 24 in the width direction W.

While the present invention has been described with reference to the preferred embodiment, it is to be understood that the description does not limit the present invention, and various modifications may be made.

DESCRIPTION OF REFERENCE CHARACTERS

1 Chuck Mechanism
10 Chuck Body
11 Guide Groove (T-Shaped Groove)
20 Master Jaw
21 Wedge
21a End Face of Wedge in Width Direction
22 Reinforcement Rib
23 Narrow Portion
23a End Face of Narrow Portion in Width Direction
24 Wide Portion
24a End Face of Wide Portion in Width Direction
30 Top Jaw
40 Plunger
41 Wedge Groove

The invention claimed is:

1. A chuck mechanism comprising:
a chuck body;
an axially movable plunger disposed inside the chuck body; and
a master jaw that is disposed in an axially front face of the chuck body and is radially movable by wedge action caused by being fit with the plunger, wherein
a guide groove that radially guides the master jaw and has a T-shaped cross section is formed in the axially front face of the chuck body,
the master jaw has a narrow portion and a wide portion that form a T-shaped cross section,
a wedge projecting toward an axially rear side is formed at a radially inner end of the wide portion, and the wedge is fitted in a wedge groove formed in the plunger,
an end face of the wedge in the width direction is positioned outward in a width direction with respect to an end face of the narrow portion in the width direction, and
the radially inner end of the wide portion extends to a radially inner end of the master jaw.

2. The chuck mechanism of claim 1, wherein $L \geq \frac{1}{3} \times L_0$ is satisfied, where a distance between the end face of the narrow portion in the width direction and the end face of the wedge in the width direction is represented by $L$, and a distance between the end face of the narrow portion in the width direction and an end face of the wide portion in the width direction is represented by $L_0$.

3. The chuck mechanism of claim 1, wherein the end face of the wedge in the width direction is flush with an end face of the wide portion in the width direction.

4. The chuck mechanism of claim 1, wherein a reinforcement rib narrower than the wedge is formed on a radially outer side face of the wedge.

5. The chuck mechanism of claim 4, wherein a radially outer end face of the reinforcement rib is positioned radially inside an area in contact with the guide groove of the chuck body in the wide portion.

* * * * *